(12) United States Patent
Matsunaga et al.

(10) Patent No.: US 10,571,152 B2
(45) Date of Patent: Feb. 25, 2020

(54) REVERSE COMBUSTION TYPE COMBUSTION APPARATUS

(71) Applicant: NORITZ CORPORATION, Hyogo (JP)

(72) Inventors: Hironao Matsunaga, Kobe (JP); Eiji Kanki, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 186 days.

(21) Appl. No.: 15/861,786

(22) Filed: Jan. 4, 2018

(65) Prior Publication Data

US 2018/0195759 A1 Jul. 12, 2018

(30) Foreign Application Priority Data

Jan. 6, 2017 (JP) .................................. 2017-000907

(51) Int. Cl.
| | |
|---|---|
| *F23L 17/00* | (2006.01) |
| *F24H 1/14* | (2006.01) |
| *F24H 9/20* | (2006.01) |
| *F24H 9/00* | (2006.01) |
| *F24H 9/14* | (2006.01) |
| *F23J 13/04* | (2006.01) |
| *F23B 50/06* | (2006.01) |
| *F24H 3/10* | (2006.01) |

(52) U.S. Cl.
CPC ............... *F24H 1/14* (2013.01); *F23B 50/06* (2013.01); *F23J 13/04* (2013.01); *F23L 17/005* (2013.01); *F24H 9/0084* (2013.01); *F24H 9/146* (2013.01); *F24H 9/2042* (2013.01); *F23J 2213/302* (2013.01); *F23J 2900/13023* (2013.01); *F24H 3/105* (2013.01)

(58) Field of Classification Search
CPC .......................................................... F24H 1/14
USPC ............................................................ 431/20
See application file for complete search history.

(56) References Cited

U.S. PATENT DOCUMENTS

| | | | |
|---|---|---|---|
| 3,791,482 A * | 2/1974 | Sykora | F01N 1/08 181/229 |
| 2007/0209606 A1* | 9/2007 | Hamada | F24H 1/43 122/18.1 |

FOREIGN PATENT DOCUMENTS

JP 3435976 B2 8/2003

\* cited by examiner

*Primary Examiner* — Avinash A Savani
(74) *Attorney, Agent, or Firm* — Studebaker & Brackett PC

(57) ABSTRACT

A reverse combustion type combustion apparatus (1) includes a combustion section (2) that combusts fuel in a downward direction, heat exchangers (4, 5) disposed under the combustion section (2), and an exhaust box (6) disposed under the heat exchangers (4, 5). The exhaust box (6) is a molded product made from a synthetic resin material; the exhaust box (6) includes an opening portion (30) for introduction of combustion exhaust gases generated by an upper portion, a fixing portion (33) for fixing the heat exchanger (5), and an inclined bottom portion (35) that collects condensed water generated by the heat exchanger (5); and, at the lower end portion of the exhaust box (6), at least three legs (40) are integrally formed and make the exhaust box (6) stand up by itself.

3 Claims, 8 Drawing Sheets

REVERSE COMBUSTION TYPE COMBUSTION APPARATUS

BACKGROUND OF THE INVENTION

The present invention relates to a reverse combustion type combustion apparatus, and more particularly relates to such a combustion apparatus that is provided with an improved construction for an exhaust box.

From the past, heating devices with hot water supply function that are capable of operating by changing over between room heating operation and hot water supply operation have been widely employed. This type of heating device with hot water supply function typically comprises a combustion means, a heat exchanger for supplying heat to a room heating thermal medium, a circulation passage that connects the heat exchanger and a room heating radiator unit, a circulation pump provided in the circulation passage, a bypass passage that bypasses the room heating radiator unit, a heat exchanger partway along the bypass passage for supplying heat to cold water, and so on. In the case of relatively small combustion apparatuses of various types, including a heating device with hot water supply function of this type, in some cases, a reverse combustion type combustion system is adopted, in which the fuel is combusted in a downward direction.

The hot water supply apparatus disclosed in Japanese Patent Publication No. 3,435,976 is built as a reverse combustion type combustion apparatus in which a burner is disposed below a fan, a heat exchanger is disposed below the burner, an exhaust box is disposed below the heat exchanger, and a muffler (i.e. an exhaust duct) that is connected to the exhaust box is disposed at the rear side of the fan, the burner, and the heat exchanger, so that combustion takes place downward from the burner.

In a per se conventional reverse combustion type combustion apparatus, an exhaust box made from metal has been employed, but nowadays, in many cases, an exhaust box made from a synthetic resin material is being employed, and, since condensed water generated in the heat exchanger from the combustion exhaust gases drips down into the exhaust box, in order to enhance the performance for drainage of this condensed water, the bottom portion of the exhaust box is formed, not in a flat shape, but in a concave shape composed of a plurality of inclined surfaces, with a discharge port being formed at its lowermost portion.

On the other hand, when a combustion apparatus is being assembled on an assembly line, normally, an assembled equipment unit is manufactured in which a burner, a primary heat exchanger, a secondary heat exchanger, an exhaust box, and an exhaust duct are assembled together in the form of a unit, and this assembled equipment unit is then fitted into an outer casing together with other accessory equipment.

When employing an exhaust box made from metal, which has excellent strength, as in the case of the reverse combustion type combustion apparatus of above described Japanese Patent, it is common to form the bottom surface of the exhaust box as flat, so that, when the combustion apparatus is to be assembled on the assembly line, an assembled equipment unit can first be manufactured by attaching the heat exchangers and the burner to the exhaust box in the state in which the exhaust box is stood up by itself, and subsequently this assembled equipment unit is fitted into the outer casing.

However, since an exhaust box that is made from a synthetic resin material can be manufactured in any desired shape, accordingly in many cases, as mentioned above, in order to enhance the performance for drainage of condensed water, the bottom portion of the exhaust box is formed, not in a flat shape, but in a concave shape that includes a plurality of inclined surfaces. In such a case, it is not possible to assemble the heat exchangers and the burner to the exhaust box in the state in which the exhaust box is standing up by itself.

As an alternative, it would also be possible to assemble the burner, the heat exchangers, and the exhaust box in a state in which they are laid down on their sides, but in this case there is a danger that a part of one of the heat exchangers, or the passage portion of the exhaust duct, or a flange of a pipe connection portion or the like may be damaged; and this is also disadvantageous because the area which the assembled equipment unit occupies on the assembly line becomes larger.

As another alternative, it would be possible to adopt a method of assembly in which a temporary stand made from wood or synthetic resin is prepared, the exhaust box is fixed on this temporary stand in a vertical attitude, and then the heat exchangers and the burner are assembled to the exhaust box. However, this method of assembly is disadvantageous because it involves an additional manufacturing cost for the temporary stand and also a handling cost, and moreover it takes substantial time and effort to fix the exhaust box to the temporary stand and later to remove the completed assembly therefrom.

An object of the present invention is to provide a reverse combustion type combustion apparatus employing an exhaust box that is formed from synthetic resin, and that has a construction which makes it stand up by itself.

SUMMARY OF THE INVENTION

The present invention presents a reverse combustion type combustion apparatus comprising: a combustion means that combusts fuel in a downward direction; a heat exchanger disposed under the combustion means; and an exhaust box disposed under the heat exchanger; wherein the exhaust box is constituted with a molded product made from a synthetic resin material; the exhaust box comprises an opening portion formed at an upper portion for introduction of combustion exhaust gases, a fixing portion for fixing the heat exchanger, and an inclined bottom portion that collects condensed water generated by the heat exchanger; and a lower end portion of the exhaust box comprises a leg portion integrally formed which makes the exhaust box stand up by itself.

According to the structure described above, since the exhaust box is constituted with a molded product made from a synthetic resin material, accordingly the freedom in the design and the manufacture thereof are high, and it can be manufactured at a cheap price. Moreover, it is possible for the combustion exhaust gases to be introduced thereinto through its opening portion, it is possible to fix the heat exchanger to its fixing portion, and it is possible to collect condensed water at its bottom portion.

Furthermore, during assembly of the combustion apparatus, since it is possible to make the exhaust collection portion stand up by itself on the leg portion on an assembly line, and since it is possible then to assemble the heat exchanger, the combustion means, and an exhaust duct to the exhaust box in a convenient manner, accordingly there is no danger of damage to any of these devices, and moreover it is possible to perform the assembly in a small working area, and it is possible to perform assembly of the combustion apparatus without any waste of time and without any useless labor.

In a preferable first aspect of the present invention, the leg portion projects lower than the bottom portion of the exhaust box.

According to this structure, without imposing any load upon the bottom portion of the exhaust box, it is possible to support the exhaust box to which the heat exchanger and the combustion means are attached upon at least three leg portions.

In a preferable second aspect of the present invention, a discharge port for discharging the condensed water to the exterior is provided to the exhaust box. According to this structure, it is possible reliably to discharge the condensed water from the discharge port to the exterior.

In a preferable third aspect of the present invention, an exhaust duct for changing the direction of discharge of the introduced combustion exhaust gases to upward, and for discharging the combustion exhaust gases from an upper portion of the combustion apparatus to the exterior, is integrally connected to the exhaust box.

According to this structure, it is possible to discharge the combustion exhaust gases from the upper portion of the combustion apparatus to the exterior via the exhaust duct, and it is possible to attach the exhaust duct to the exhaust box together with the heat exchanger and the combustion means.

DETAILED DESCRIPTION

Figure 1:
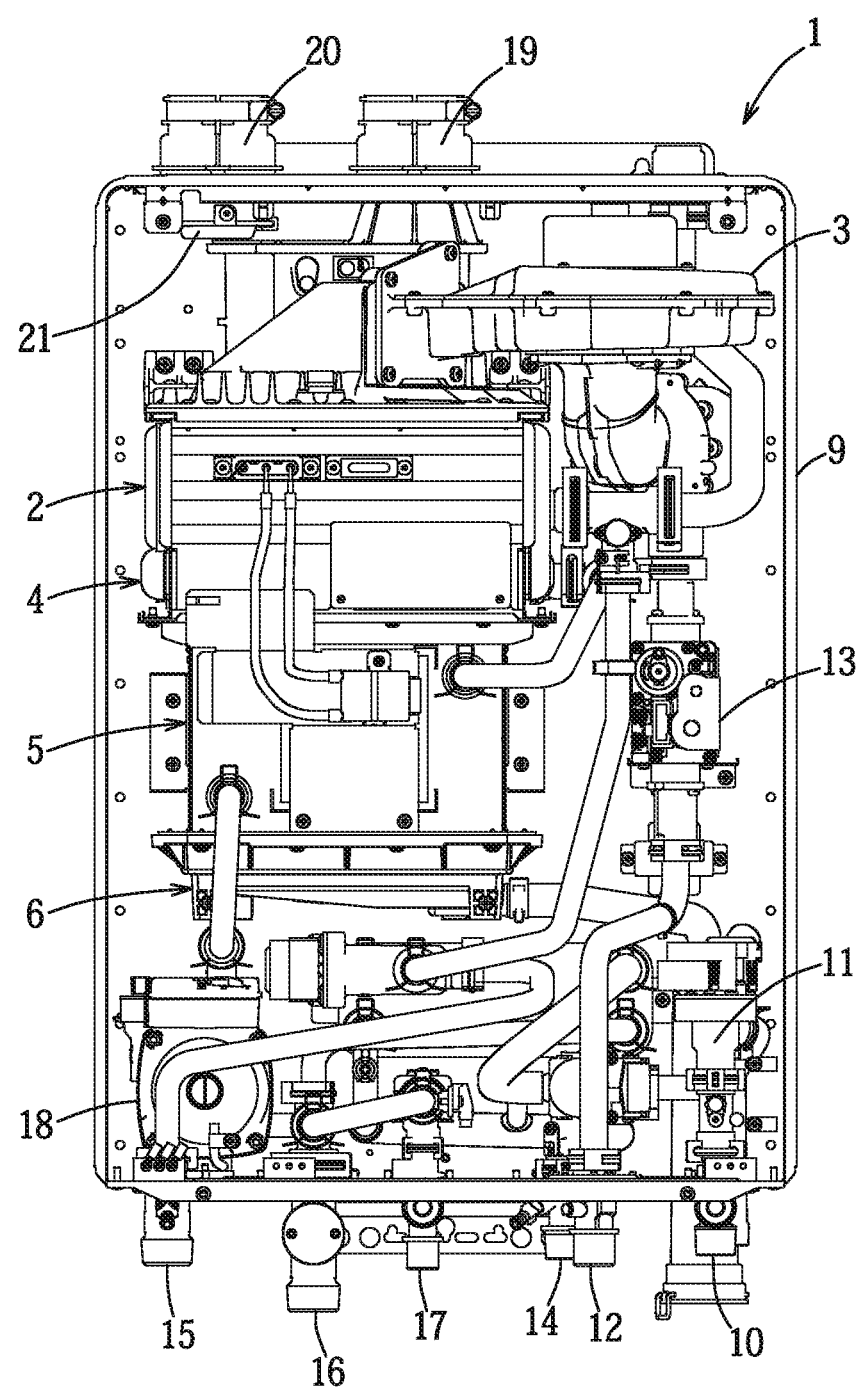
FIG. 1 is an elevation view of a reverse combustion type combustion apparatus according to an embodiment of the present invention (its front cover is not shown)
Figure 2:
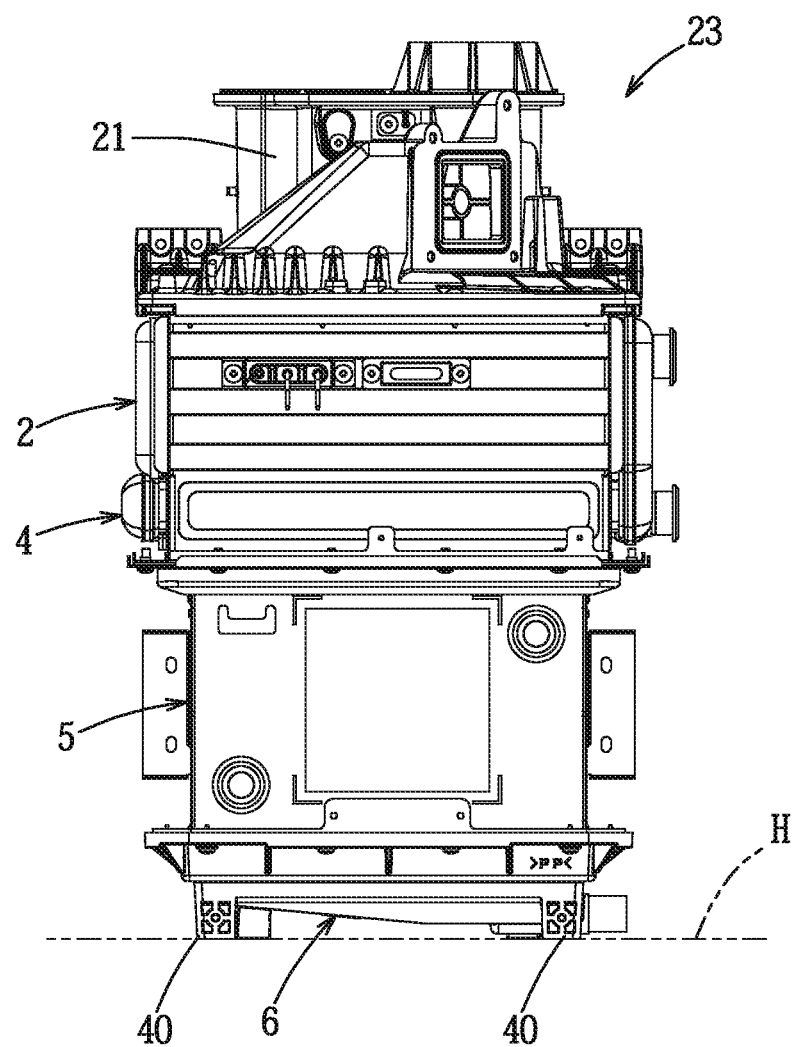
FIG. 2 is an elevation view of an assembled equipment unit.
Figure 3:
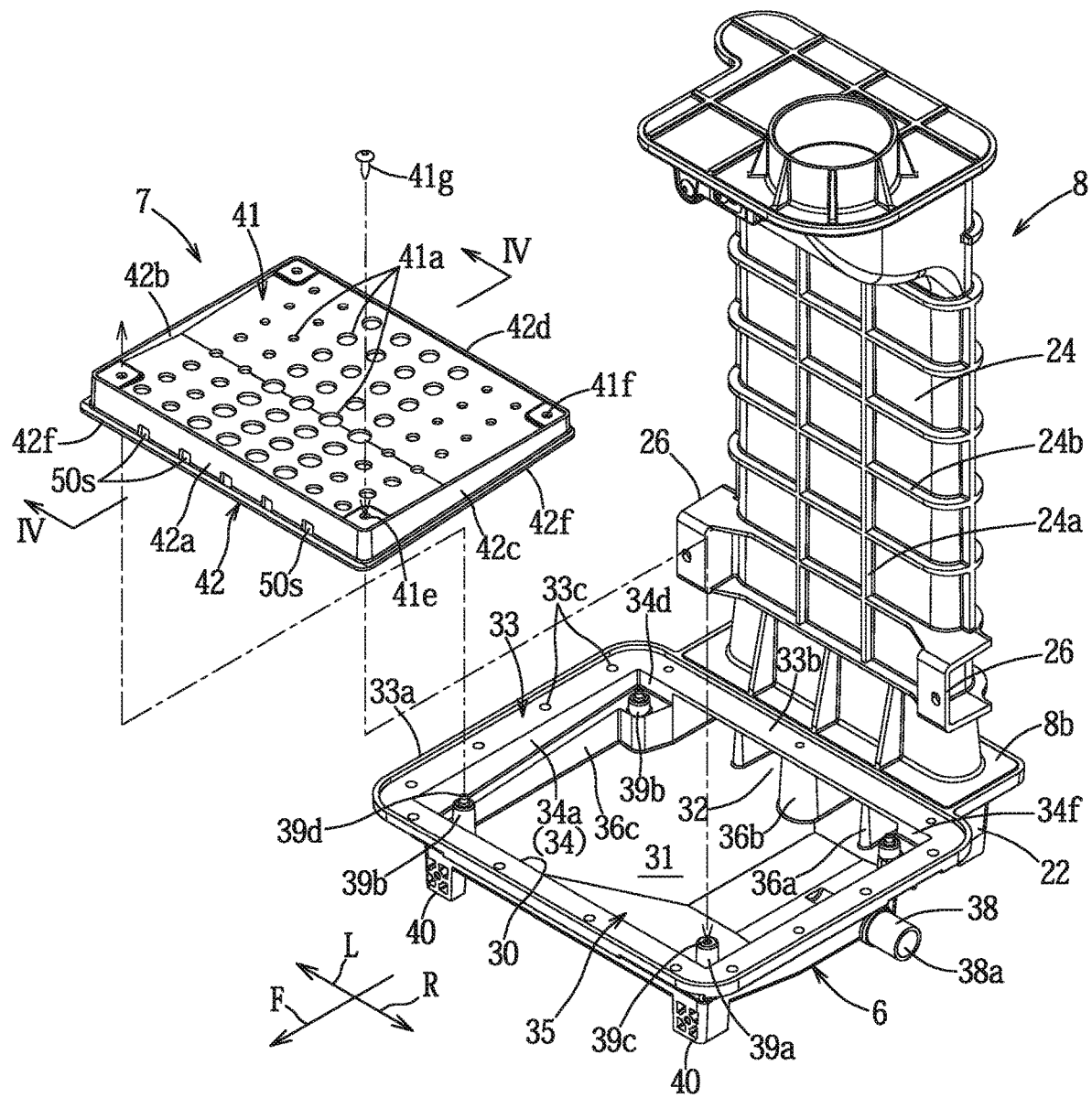
FIG. 3 is a perspective view showing an exhaust box, an exhaust duct, and an exhaust rectifier plate in a disassembled state.

A reverse combustion type combustion apparatus according to an embodiment of the present invention will now be explained on the basis of the drawings. As shown in FIGS. 1 through 3, this reverse combustion type combustion apparatus 1 functions as a heating device with hot water supply function that has a function of supplying heat to a thermal medium for room heating, and also has a function of supplying heat to cold water via the room heating thermal medium, thus producing hot water for supply. Taking the direction toward the viewer from the drawing paper of FIG. 1 as being forward, the arrow F shown in FIG. 3 indicates forward, the arrow L indicates leftward, and the arrow R indicates rightward.

As principal devices, this reverse combustion type combustion apparatus 1 comprises a combustion section 2 (i.e. a combustion means) having a burner that combusts fuel downward and a combustion space, a blower fan 3 that supplies air for combustion to the combustion section 2, a primary heat exchanger 4 (i.e. a heat exchanger for sensible heat recovery) disposed below the combustion section 2, a secondary heat exchanger 5 (i.e. a heat exchanger for latent heat recovery) disposed below the primary heat exchanger 4, an exhaust box 6 disposed below the secondary heat exchanger 5, an exhaust rectifier plate 7 installed within the exhaust box 6, an exhaust duct 8 (i.e. a muffler) connected to the exhaust box 6, and so on, and these devices are housed in the interior of an outer casing 9.

Other accessories provided include a water inlet fitting 10 for introduction of cold water, a water intake flow rate metering device 11, a gas supply coupling 12 for supply of gas for fuel, a gas flow rate adjustment valve 13, a hot water supply coupling 14 for hot water supply, a room heating feed coupling 15 that supplies the room heating thermal medium to a room heating radiator unit (not shown), a room heating return coupling 16 that takes back the room heating thermal medium from the room heating radiator unit, a heating medium replenishment coupling 17 for replenishing the room heating thermal medium, a pump 18 for circulating the thermal medium, an exhaust discharge portion 19 for discharging the combustion gases to the exterior, a filter installation portion 20 for fitting a filter for the combustion air, a plate type heat exchanger (not shown) for supplying heat to cold water from the heated thermal medium, and so on.

The outer casing 9 is formed from thin metallic plate as a box-shaped rectangular parallelepiped, and a front cover (not shown) is detachably installed on its front surface. The combustion section 2, the blower fan 3, an air intake portion 21 are disposed in an upper portion within the outer casing 9, with the primary heat exchanger 4 which is a fin-and-tube type heat exchanger being disposed beneath the combustion section 2, with the secondary heat exchanger 5 which is a plate type heat exchanger being connected below this primary heat exchanger 4, and with the exhaust box 6 being connected below the secondary heat exchanger 5.

As shown in FIGS. 3 and 5 through 7, at a duct connection portion 22 at the rear portion of the exhaust box 6, the direction of discharge of the combustion exhaust gases entering from the secondary heat exchanger 5 is changed into an upward direction, and furthermore an exhaust duct 8 for discharging the combustion gases from the upper part of the combustion apparatus 1 to the exterior is integrally connected to this duct connection portion 22.

When the combustion apparatus 1 described above is to be assembled upon an assembly line, a method of assembling the combustion apparatus 1 is employed in which the exhaust duct 8 is connected to the exhaust box 6, an assembled equipment unit 23 (refer to FIG. 2) in which the secondary heat exchanger 5, the primary heat exchanger 4, the combustion section 2, the air intake portion 21 and so on are attached together is assembled to the exhaust box 6 and the exhaust duct 8, and then this assembled equipment unit 23 and other accessory equipments are fitted within the outer casing 9.

The exhaust duct 8 is formed by integrally joining together a plurality of molded components that are made from synthetic resin. This exhaust duct 8 comprises a flattened passage forming section 24 constituting an exhaust passage 8a that extends upward from the duct connection portion 22 at the rear portion of the exhaust connecting plenum 6 to the upper end of the combustion apparatus 1, and an exhaust gas venting aperture 25 continuing to the upper end of the passage forming section 24 and having a barrel portion. The exhaust passage 8a has a flattened elliptical shape in cross section, with its front-to-back dimension being relatively small and its left-to-right dimension being relatively large. A plurality of longitudinal ribs 24a and a plurality of horizontal ribs 24b for reinforcement are formed on the outer surface of the passage forming section 24. And a pair of left and right fixing brackets 26 for fixing the secondary heat exchanger 5 are also formed at the lower portion of the passage forming section 24.

Next, the exhaust box 6 will be explained.

As shown in FIG. 3 and FIGS. 5 through 9, the exhaust box 6 is built as a molded product that is quadrilateral in plan view and whose upper surface is open. The exhaust box 6 comprises an opening portion 30, an exhaust collection portion 31 through which the combustion exhaust gases G flow, a discharge port 32 that extends rearward from the rear edge of the exhaust collection portion 31 and that moreover is connected to the exhaust passage 8a in the exhaust duct 8, a fixing portion 33, a vertical wall portion 34, an inclined bottom portion 35, and a duct connection portion 22.

The opening portion 30 is a large quadrilateral opening portion for collecting the combustion exhaust gases G from the secondary heat exchanger 5, and is formed at the upper side of the exhaust box 6.

The fixing portion 33 is a horizontal fixing portion for fixing to fixing flanges 52, 55 that are provided around the external periphery of the casing 5a of the secondary heat exchanger 5; this fixing portion 33 is formed in the shape of a quadrilateral frame of a predetermined width around the external circumferential portion of the opening portion 30, with a plurality of screw holes 33c being formed in the fixing portion 33 for fixing the fixing flanges 52, 55, and with a convex edge portion 33a that projects slightly upward being formed around the external circumference of the fixing portion 33.

A vertical surrounding wall portion 34 is a wall portion formed in the shape of a quadrilateral frame and extending downward from the internal peripheral portion of the fixing portion 33, and is formed in an L shaped cross section in order to define a groove portion 50 that will be described hereinafter in cooperation with the exhaust rectifier plate 7. The lower edges of the left wall 34a and the right wall 34b of the vertical surrounding wall portion 34 are formed so as to slope downward toward the front, and the front wall 34c of the vertical surrounding wall portion 34 is formed to have a constant width and to be continuous with the front edges of the left wall 34a and the right wall 34b. A horizontal shelf portion 34s is formed to continue from the lower edges of the left wall 34a, the right wall 34b, and the front wall 34c to the inside. The rear wall of the vertical surrounding wall portion 34 has a rear wall left end portion 34d continuous with the left wall 34a, and a rear wall right end portion 34f continuous with the right wall 34b.

A plurality of connecting portions 36a, 36b are formed in the discharge port 32, and connect the fixing portion 33 and the bottom portion 35. An inclined bottom portion 35 for collecting condensed water (i.e. drain water) generated from the combustion exhaust gases G by the secondary heat exchanger 5 comprises a peripheral wall portion 36, a horizontal plate portion 35a, a left side inclined plate portion 35b, a front side inclined plate portion 35c, and a rear side inclined plate portion 35d (refer to FIG. 6).

The peripheral wall portion 36 is a formed as a quadrilateral wall frame portion, extending downward from the internal peripheral portions of the vertical surrounding wall portion 34 and the shelf portion 34s. The horizontal plate portion 35a is formed at the right side portion of the bottom portion 35 and moreover at the central portion thereof in the front-to-rear direction, and constitutes the lowest portion of the bottom portion 35, with the right end portion of the horizontal plate portion 35a being connected to the right wall 36a of the peripheral wall portion 36. Moreover, the left side inclined plate portion 35b extends slopingly upward toward the left from the horizontal plate portion 35a, and is connected to the left wall 36c of the peripheral wall portion 36.

The front side inclined plate portion 35c extends slopingly upward toward the front from the horizontal plate portion 35a, and connects to the front wall 36b and the right wall 36a of the peripheral wall portion 36. And the rear side inclined plate portion 35d extends slopingly upward toward the rear from the horizontal plate portion 35a, and connects to the right wall 36a of the peripheral wall portion 36.

The duct connection portion 22 is integrally formed at the rear portion of the exhaust box 6, and a lower end flange 8b of the exhaust duct 8 is joined to the upper end of the duct connection portion 22. A plurality of triangular ribs 37 are also provided for reinforcing the fixing portion 33 and the vertical surrounding wall portion 34.

A drainage port 38a is provided at the bottom portion 35 of the exhaust box 6 for discharging condensed water collected on the bottom portion 35 to the exterior. This drainage port 38a consists of a horizontal drainage tube 38 that passes through the right wall 36a of the peripheral wall portion 36 and is connected to the horizontal plate portion 35a, and that can drain away condensed water collected on the horizontal plate portion 35a.

Four boss portions 39a, 39b for fixing the exhaust rectifier plate 7 horizontally are formed at the four corners of the bottom portion 35 so as to project upward, and a screw hole 39c is formed in the boss portion 39a at the right front corner, while vertically oriented pin portions 39d are formed integrally on the other three boss portions 39b.

At the lower end portion of the exhaust box 6, four legs 40 are formed unitarily at the four corner portions of the peripheral wall portion 36, and, when the assembled equipment unit 23 shown in FIG. 2 is assembled, these four legs 40 make the exhaust box 6 stand up by itself upon a horizontal surface H as shown in FIG. 2. These legs 40 are L shaped in cross section, and project further downward than the bottom portion 35 of the exhaust box 6. The number of the legs 40 is not limited to being four; however, at least three legs 40 must be formed in order for the exhaust box 6 to stand up by itself.

Next, the exhaust rectifier plate 7 will be explained.

As shown in FIGS. 3 through 9, the exhaust rectifier plate 7 is made as a molded product from a synthetic resin material. The exhaust rectifier plate 7 comprises a main body portion 41 formed as a quadrilateral plate, and an outer peripheral wall 42 formed integrally around the external peripheral portion of the main body portion 41.

A plurality of holes 41a are formed in the plate shaped main body portion 41, for example in the form of a matrix having eight rows and eight columns. The diameters of the four columns of holes 41a in the central portion of the eight columns of holes 41a are set to be, for example, 1.5 to 2.0 times the diameters of the two columns of holes 41a on the left side portion and of the two columns of holes 41a on the right side portion. This is done in order to allow more of the combustion exhaust gases G to flow through the central portion of the secondary heat exchanger 5, which has a large heat exchange capacity, than through its portions on the left and the right. The arrangement of the plurality of holes is not limited to being an eight rows and eight columns.

The diameters of the plurality of holes 41a become greater toward the upstream side (i.e. the front side) of the direction of exhaust gas flow within the exhaust box 6. This is because there is a tendency for a larger amount of the combustion exhaust gases G to flow through the rear half portion of the secondary heat exchanger 5 which is the part closer to the exhaust duct 8, and is in order for the combustion exhaust gases G to flow equally over the entire secondary heat exchanger 5. In this manner, the opening areas of the holes 41a in the exhaust rectifier plate 7 are set so as to be larger on the upstream side (i.e. the front side) of the direction in which the combustion exhaust gases G flow within the exhaust box 6. Due to this, it is possible to equalize the state of gas flow distribution of the combustion exhaust gases G flowing within the exhaust box 6.

Figure 4:
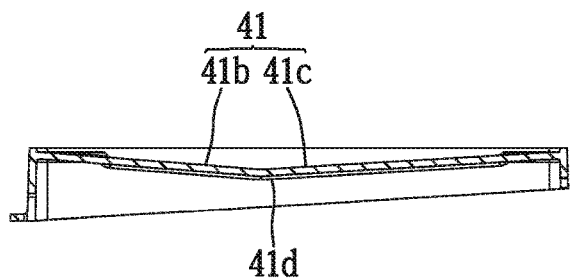
FIG. 4 is a sectional view taken along lines IV-IV of FIG. 3.
Figure 5:
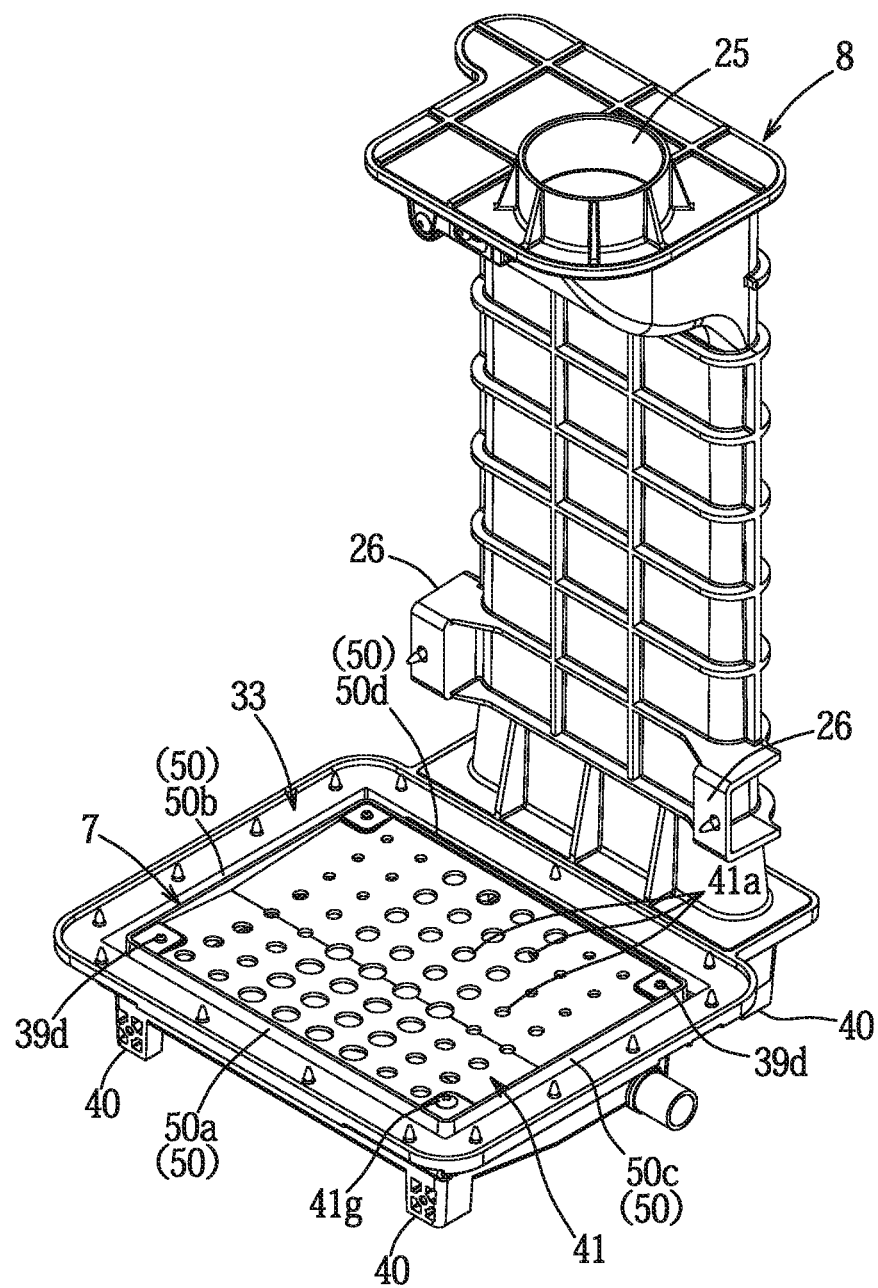
FIG. 5 is a perspective view of the exhaust box, the exhaust duct, and the exhaust rectifier plate.
Figure 6:
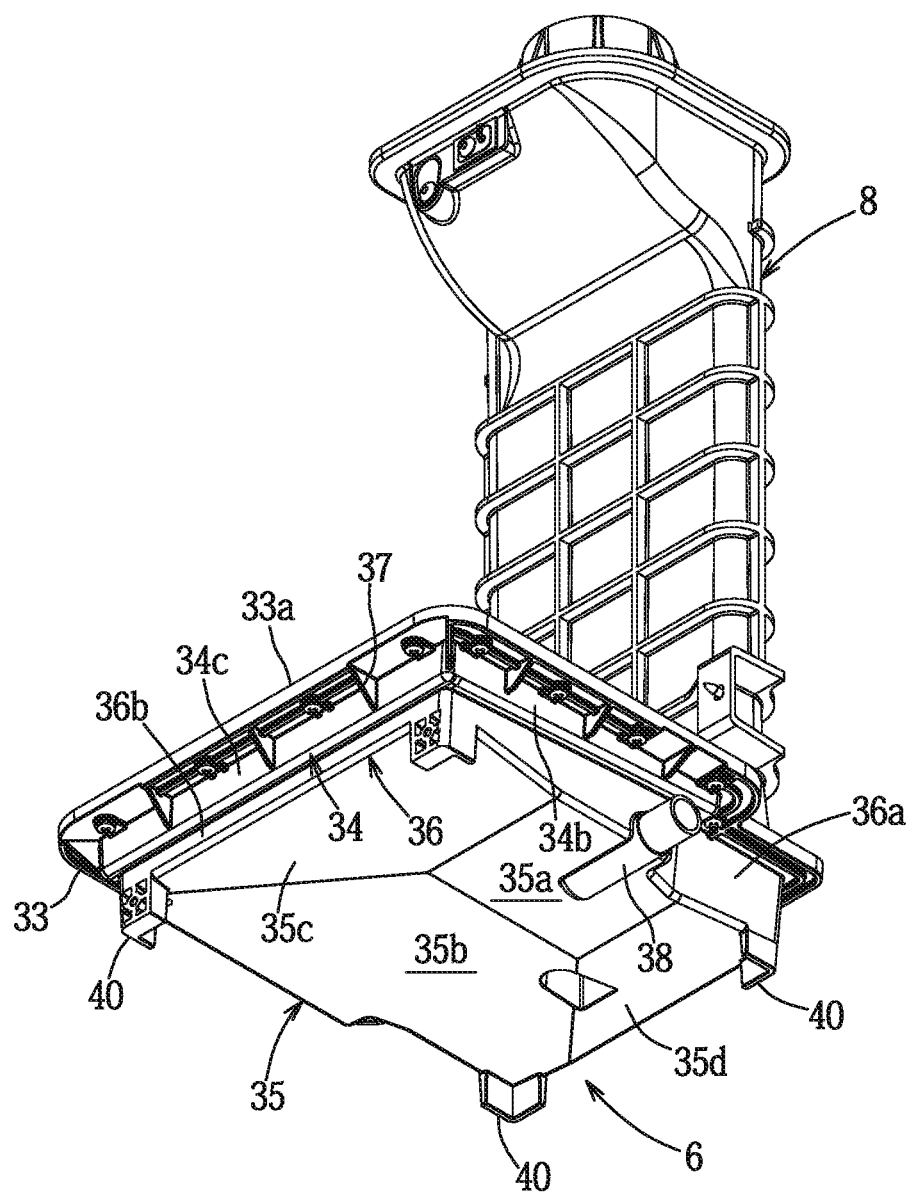
FIG. 6 is another perspective view of the exhaust box, the exhaust duct, and the exhaust rectifier plate, seen from a different angle.
Figure 7:
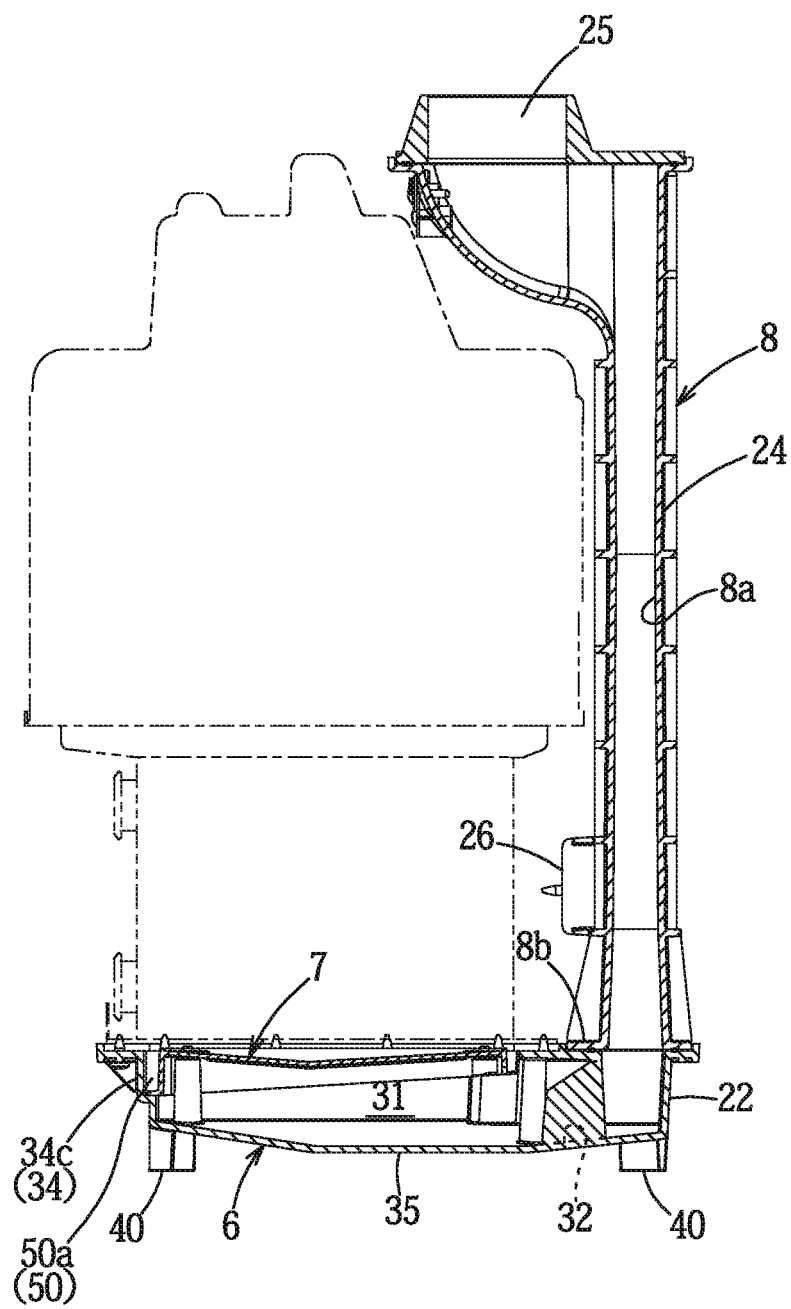
FIG. 7 is a vertical sectional view of the exhaust box, the exhaust duct, and the exhaust rectifier plate.

As shown in FIG. 4, the upstream side half 41b and the downstream side half 41c of the exhaust rectifier plate 7 in the direction of the main body portion 41 through which the combustion exhaust gases flow are both formed so as to be inclined downward to a central portion 41d at the middle of the direction of flow of the combustion exhaust gases in the exhaust box 6. Due to this, part of the condensed water that has dripped down from the heat exchanger 5 onto the exhaust rectifier plate 7 flows to the central portion 41d in the direction of flow of the combustion exhaust gases along the slopes of the upstream side half 41b and the downstream side half 41c of the main body portion 41, and then drips from the plurality of holes 41a to the bottom portion of the exhaust box 6. Thus, since the droplets of condensed water that fall down to the bottom portion 35 become larger, accordingly it becomes possible, to the greatest possible extent, to prevent discharge to the exhaust duct 8 of condensed water that is riding on the gas flow of the combustion exhaust gases G.

A screw hole 41e corresponding to the screw hole 39c in the boss portion 39a of the exhaust box 6 and three pin holes 41f corresponding to the three pin portions 39d of the three boss portions 39b are formed at the four corner portions of the main body portion 41. The exhaust rectifier plate 7 is fixed to the exhaust box 6 and positionally determined with respect thereto by mounting the exhaust rectifier plate 7 on the four boss portions 39a, 39b, by respectively engaging the three pin portions 39d into the three pin holes 41f, and by screwing the screw 41g from above into the screw holes 39c, 41e.

As shown in FIGS. 5 and 7 through 9, a groove portion 50 for flowing condensed water generated by the secondary heat exchanger 5 from the combustion exhaust gases G is provided around the periphery of the exhaust rectifier plate 7. The groove portion 50 is formed to be an inclined shape that becomes lower toward the upstream side of the direction of flow of the combustion exhaust gases G in the exhaust box 6 and an opening portion 50s for discharge of condensed water from the groove portion 50 is formed in the bottommost portion of the groove portion 50. The groove portion 50 is formed in the shape of a quadrilateral frame from a front side groove 50a, a left side groove 50b, a right side groove 50c, and a rear side groove 50d.

The front wall 42a, the left wall 42b, and the right wall 42c of the outer peripheral wall 42 of the exhaust rectifier plate 7 are formed in L shaped cross sections, and an outwardly oriented flange 42f is formed at the lower edges thereof. The front wall 42a of the outer peripheral wall 42 is formed to be of almost the same size as the front wall 34c of the vertical surrounding wall portion 34 of the exhaust box 6, and a front side groove 50a of the groove portion 50 is defined to be horizontal by mounting the flange 42f around the lower edge of the front wall 42a on the shelf portion 34s of the front wall 34c of the vertical surrounding wall portion 34. And a plurality (for example, five) of opening portions 50s for discharging condensed water flowing in to the front side groove 50a to the bottom portion 35 are formed on the front wall 42a of the outer peripheral wall 42.

By the left wall 42b of the outer peripheral wall 42 being formed in a similar shape to and of almost the same size as the left wall 34a of the vertical surrounding wall portion 34 of the exhaust box 6, and by the flange 42f at the lower edge of the left wall 42b being mounted above the shelf portion 34s of the left wall 34a of the vertical surrounding wall portion 34, the left side groove portion 50b of the groove portion 50 is formed so as to be inclined downward toward the front, so that it becomes lower toward the upstream side of the direction of flow of the combustion exhaust gases. In other words, the depth of the left side groove 50b becomes greater toward the front.

Similarly, by the right wall 42c of the outer peripheral wall 42 being formed in a similar shape to and of almost the same size as the right wall 34b of the vertical surrounding wall portion 34 of the exhaust box 6, and by the flange 42f at the lower edge of the right wall 42c being mounted above the shelf portion 34s of the right wall 34b of the vertical surrounding wall portion 34, the right side groove portion 50c of the groove portion 50 is formed so as to be inclined downward toward the front, so that it becomes lower toward the upstream side of the direction of flow of the combustion exhaust gases. In other words, the depth of the right side groove 50c becomes greater toward the front. Moreover, the rear side groove 50d of the groove portion 50 is formed between the rear wall 42d of the outer peripheral wall 42 and the rear edge portion 33b of the fixing portion 33.

In this manner, the groove portion 50 is formed in an inclined configuration that becomes lower toward the front, and the condensed water that has dripped down into the groove portion 50 is collected in the front side groove 50a, and flows from the plurality of opening portions 50s into the bottom portion 35. And, as shown in FIG. 8, a connection portion 51 is provided for connecting the lower end portion of the secondary heat exchanger 5 into the upper end portion of the exhaust box 6, and this connection portion 51 is built so that the lower end portion of the secondary heat exchanger 5 engages into the groove portion 50.

A fixing flange 52 formed in cross section of a cranked shape is joined to the lower end portions of the front surface plate, the left side plate, and the right side plate of a casing 5a of the secondary heat exchanger 5, and this fixing flange 52 is mounted on the upper surface of the fixing portion 33 of the exhaust box 6 via a packing 53, and is fixed there by a plurality of screws 54. In this fixed state, the lower end portions of the casing 5a and the fixing flange 52 are fitted into and engaged in the groove portion 50, and a gap is defined between the casing 5a and the outer peripheral wall 42 of the exhaust rectifier plate 7.

Thus, condensed water that drips down along the inner surfaces of the casing 5a of the secondary heat exchanger 5 into the groove portion 50, together with condensed water that trickles down along the plates of the heat exchanger 5 and reaches its lower end and, after having flowed to the side of the casing 5a, drips down within the groove portion 50, is collected in the front side groove 50a via the inclinations of the left side groove 50b and of the right side groove 50c, and passes from the front side groove 50a through the plurality of opening portions 50s, to be then discharged to the bottom portion 35 of the exhaust box 6.

Figure 8:
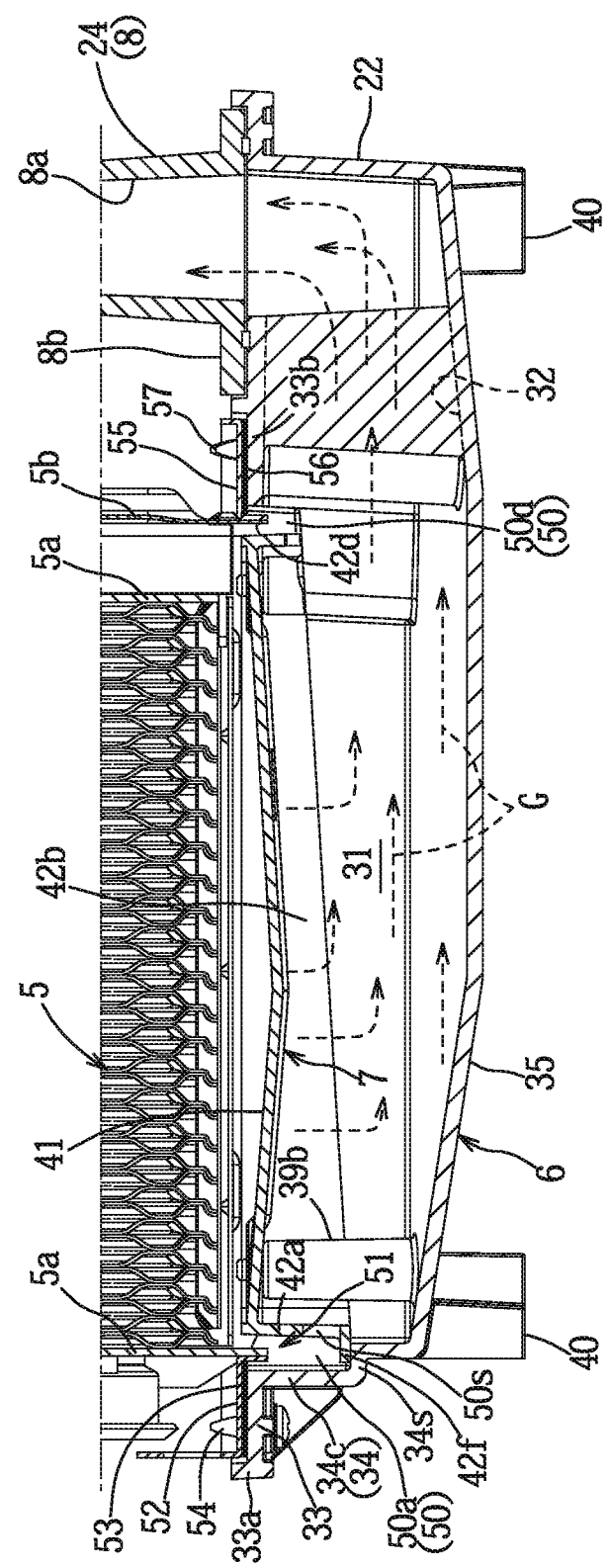
FIG. 8 is an enlarged vertical sectional view of essential portions of the exhaust box, a heat exchanger, and the exhaust duct.
Figure 9:
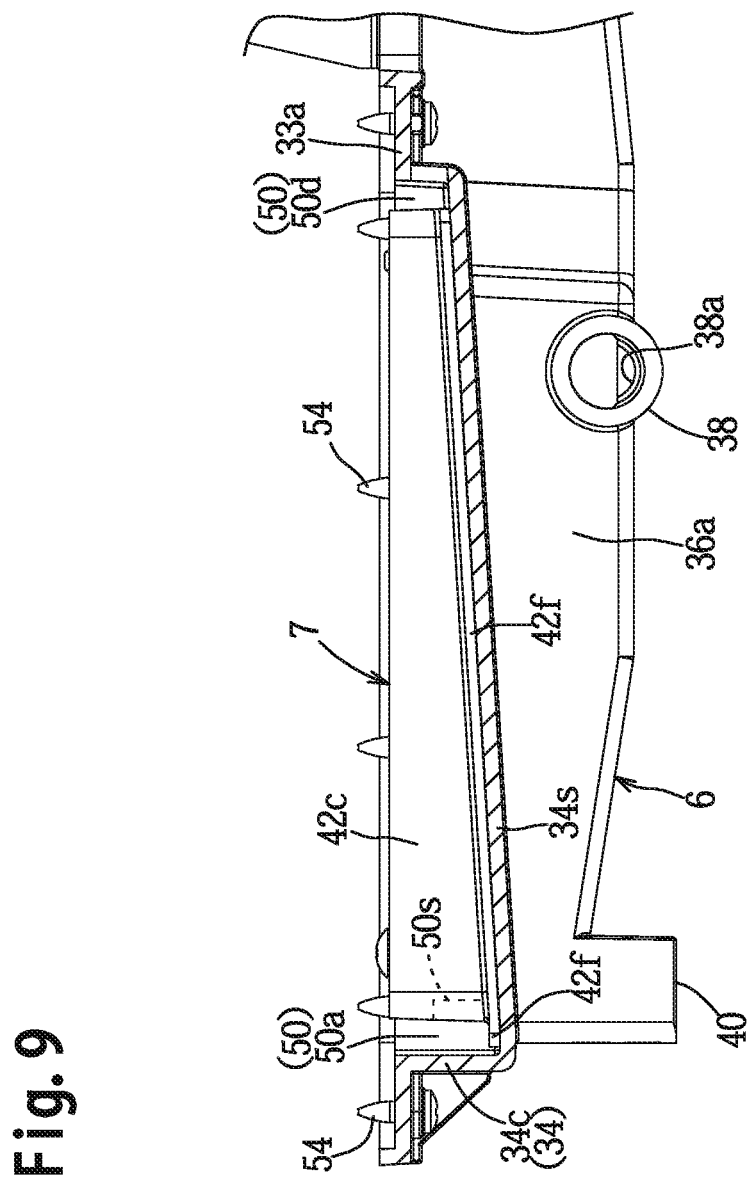
FIG. 9 is a vertical sectional view of essential portions of the exhaust box, and including a side view of the exhaust rectifier plate.

Since, as shown in FIG. 8, the rear surface plate of the casing 5a of the secondary heat exchanger 5 is located in a position somewhat separated from and more forward than the rear edge of the exhaust rectifier plate 7, accordingly the condensed water that drips down from the rear surface plate falls down onto the exhaust rectifier plate 7, but does not fall down into the rear side groove 50d. A casing plate 5b is fixed to the rear surface plate of the casing 5a and is positioned more rearward than that rear surface plate, a fixing flange 55 that is crank shaped in cross section is fixed to the lower end portion of the casing plate 5b, the fixing flange 55 is fixed by a plurality of screws 57 to the fixing portion 33 of the exhaust box 6 with a packing 56 interposed therebetween, and the lower end portions of the casing plate 56 and the fixing flange 55 are fitted into and engaged with the rear side groove 50d.

Next, the operation and the beneficial effects of the reverse combustion type combustion apparatus 1 will be explained.

Since the exhaust box 6 is built as a molded product made from a synthetic resin material, the freedom for its design and manufacture is high, and it can be manufactured at low cost. Conveniently, the combustion exhaust gases G can be introduced into the exhaust box 6 from the opening portion 30 of the exhaust box 6, the secondary heat exchanger 5 can be fixed to the fixing portion 33 of the exhaust box 6, and condensed water can be collected at its bottom portion 35.

Since, when the combustion apparatus 1 is to be assembled, it is possible to stand the exhaust box 6 up by itself on the assembly line on its four legs 40, and it is possible then conveniently to assemble the primary and secondary heat exchangers 4, 5, the combustion section 2, and the exhaust duct 8 to the exhaust box 6, accordingly there is no fear of damage to the various parts, it is possible to perform assembly of the combustion apparatus 1 in a relatively small working area, and it is possible to perform this assembly without any waste of time or labor.

Since at least three of the legs 40 are provided for making it possible for the exhaust box 6 to stand up by itself, accordingly, without imposing any undue load upon the bottom portion 35 of the exhaust box 6, it is possible for the exhaust box 6 to stand up by itself with the combustion section 2, the primary heat exchanger 4, the secondary heat exchanger 5, the exhaust duct 8, and so on all having been assembled thereto.

And, since the drainage port 38a for drainage of condensed water is formed on the exhaust box 6, accordingly it is possible reliably to drain condensed water from the drainage port 38a to an external neutralizer.

It is possible to assemble the exhaust duct 8 to the exhaust box 6 along with the primary and secondary heat exchangers 4, 5 and the combustion section 2, and thus, with the exhaust duct 8 being connected to the exhaust box 6, it is possible for the combustion exhaust gases G in the exhaust box 6 to be discharged to the exterior from the top of the combustion apparatus 1, via this exhaust duct 8.

Since the plurality of holes 41a are formed in the main body portion 41 of the plate-shaped exhaust rectifier plate 7, accordingly, by appropriately setting the diameters of the plurality of holes 41 according to their positions on the main body portion 41, it is possible appropriately to adjust the state of gas flow distribution of the combustion exhaust gases G flowing within the secondary heat exchanger 5.

Condensed water that has dripped down from the wall surface of the casing 5a of the secondary heat exchanger 5 onto the groove portion 50, together with condensed water that flows down along the lower end of the second heat exchanger 5 to the side of the casing 5a and drips down onto the groove portion 50, flows along the slope of the groove portion 50 upstream against the flow direction of the combustion exhaust gases (i.e. toward the front), and is discharged to the bottom portion 35 of the exhaust box 6 from the opening portion 50a that is formed at the lowest portion of the groove portion 50.

Since, in this manner, the condensed water is collected in the front side groove 50a of the groove portion 50, and flows into the exhaust box 7 at the position therein that is furthest from the exhaust duct 8 which is on the most downstream side of the exhaust box 6, accordingly it is possible to prevent the condensed water from being carried on the gas flow of the combustion exhaust gases G toward the exhaust duct 8.

Since the connection portion 51 that connects the lower end portion of the secondary heat exchanger 5 and fits into the upper end portion of the exhaust box 6 is provided, and since it is arranged for the lower end portion of the secondary heat exchanger 5 to be engaged into the groove portion 50 by this connection portion 51, accordingly the condensed water that has flowed down from the casing 5a of the secondary heat exchanger 5 to the connection portion 51 and the condensed water that has flowed to the side of the casing 5a along the lower end of the secondary heat exchanger 5 reliably drip down from the connection portion 51 into the groove portion 50.

A part of the condensed water that has dripped down onto the exhaust rectifier plate 7 from the secondary heat exchanger 5 flows in the direction of flow of the combustion exhaust gases 41 to the central portion 41d along the inclinations of the upstream side half 41b and the downstream side half 41c of the main body portion 41, and then drips down from the plurality of holes 41a formed in the main body portion 41 to the bottom portion 35 of the exhaust box 6. Thus it is possible, to the greatest extent possible, to prevent condensed water from being carried on the gas flow of the combustion exhaust gases and being discharged to the exhaust duct 8.

Since the opening areas of the holes 41a in the exhaust rectifier plate 7 are set to be larger toward the upstream side of the direction in which the combustion exhaust gases flow in the exhaust box 6, accordingly it is possible to make the state of gas flow distribution of the combustion exhaust gases G flowing in the secondary heat exchanger 5 more uniform.

Next, variant examples in which the above embodiment is partially altered will be explained.

1) It will be acceptable to form the groove portion 50 integrally with the exhaust rectifier plate 7 at only the external circumferential portion of the exhaust rectifier plate 7. Alternatively, it will be acceptable to arrange to form the groove portion 50 integrally with the vertical surrounding wall portion 34 only at the internal peripheral portion of the vertical surrounding wall portion 34. In that case, it would be possible to omit the flange 42f of the outer peripheral wall 42 of the exhaust rectifier plate 7.

2) In the downstream side half 41c of the exhaust rectifier plate 7, it would also be acceptable to arrange to form circular burrings that are convex upward around the peripheral parts of the holes 41a. In this case, since the condensed water that drips down onto the downstream side half 41c of the exhaust rectifier plate 7 all flows to the bottom portion 35 of the exhaust box 6 only after having been collected at that central portion 41d, accordingly it is difficult for any of this water to be discharged to the exhaust duct 8 by being carried on the gas flow of the combustion exhaust gases.

3) Apart from the above, for a person skilled in the art, without deviating from the gist of the present invention, it would be possible to implement the present invention in various forms by making additions of various types to the embodiment described above; and the present invention is to be considered as encompassing modifications of this kind.

The invention claimed is:

1. A reverse combustion type combustion apparatus, comprising:
   a combustion means that combusts fuel in a downward direction;
   a heat exchanger disposed under the combustion means; and
   an exhaust box disposed under the heat exchanger; wherein
   the exhaust box is constituted with a molded product made from a synthetic resin material;
   the exhaust box comprises an opening portion formed at an upper portion for introduction of combustion exhaust gases, a fixing portion for fixing the heat exchanger, and an inclined bottom portion that collects condensed water generated by the heat exchanger; and
   a lower end portion of the exhaust box comprises a leg portion projected lower than the bottom portion of the exhaust box integrally formed which makes the exhaust box stand up by itself.

2. A reverse combustion type combustion apparatus according to claim 1; wherein a discharge port for discharging the condensed water to the exterior is provided to the exhaust box.

3. A reverse combustion type combustion apparatus according to claim 1; wherein an exhaust duct for changing a direction of discharge of an introduced combustion exhaust gases to upward, and for discharging the combustion exhaust gases from an upper portion of the combustion apparatus to the exterior, is integrally connected to the exhaust box.

* * * * *